United States Patent
Bouteleux

(10) Patent No.: US 10,078,769 B2
(45) Date of Patent: Sep. 18, 2018

(54) METHOD FOR CONTROLLING PERIPHERALS, ASSOCIATED PERIPHERAL DRIVER(S) AND COMPUTER PROGRAM

(71) Applicant: THALES, Courbevoie (FR)

(72) Inventor: Philippe Bouteleux, Bretigny-sur-Orge (FR)

(73) Assignee: THALES, Courbevoie (FR)

( * ) Notice: Subject to any disclaimer, the term of this patent is extended or adjusted under 35 U.S.C. 154(b) by 29 days.

(21) Appl. No.: 15/509,751

(22) PCT Filed: Jan. 21, 2015

(86) PCT No.: PCT/EP2015/051109
§ 371 (c)(1),
(2) Date: Mar. 8, 2017

(87) PCT Pub. No.: WO2015/110457
PCT Pub. Date: Jul. 30, 2015

(65) Prior Publication Data
US 2017/0243036 A1   Aug. 24, 2017

(30) Foreign Application Priority Data
Jan. 27, 2014   (FR) ..................................... 14 00186

(51) Int. Cl.
*G06K 7/10* (2006.01)
*H04L 29/08* (2006.01)

(52) U.S. Cl.
CPC .......... *G06K 7/10366* (2013.01); *H04L 67/02* (2013.01); *H04L 67/141* (2013.01)

(58) Field of Classification Search
CPC .... G06K 7/10336; H04L 67/02; H04L 67/141
(Continued)

(56) References Cited

U.S. PATENT DOCUMENTS

| 2016/0086145 A1* | 3/2016 | Tsutsui | .................... H04L 43/06 463/25 |
| 2016/0086445 A1* | 3/2016 | Tsutsui | ................ G07F 17/3248 463/25 |
| 2017/0092062 A1* | 3/2017 | Tsutsui | ................ G07F 17/3246 |

OTHER PUBLICATIONS

Alvin T.S. Chan: "Cookies On-the-Move: Managing Cookies on a Smart Card", ACM, 2 Penn Plaza, Suite 701—New York USA, Mar. 14, 2004 (Mar. 14, 2004), pp. 1693-1697, XP040173967,figure 2 abstract p. 1693, last paragraph paragraph [0004] -paragraph [04.1].

(Continued)

*Primary Examiner* — Allen T Cao
(74) *Attorney, Agent, or Firm* — B. Aaron Schulman, Esq.; Stites & Harbison, PLLC

(57) ABSTRACT

Method for controlling peripheral(s) (13) in a system comprising a server (6), user terminals (2), a peripheral driver (11) connected to a peripheral device (13), and a telecommunications network (7) connecting the server and the driver,
which comprises the transmission, via the telecommunications network, of a message to the server by a user terminal or by the server to the user terminal, comprising the following steps
  interception of said message by said driver;
  control of an operation of a peripheral device by said driver, in accordance with said intercepted message;
  modification of said intercepted message by said driver, in accordance with the controlled operation; and transmission of said modified message to the server or to the user terminal by said driver.

5 Claims, 2 Drawing Sheets

(58) Field of Classification Search
USPC .............................................. 340/10.5–10.52
See application file for complete search history.

(56) References Cited

OTHER PUBLICATIONS

International Search Report for PCT/EP2015/051109, dated May 4, 2015.
Written Opinion of the International Searching Authority for PCT/EP2015/051109, dated May 4, 2015.

* cited by examiner

METHOD FOR CONTROLLING PERIPHERALS, ASSOCIATED PERIPHERAL DRIVER(S) AND COMPUTER PROGRAM

The present invention relates to a method for controlling peripherals in a system comprising a server, user terminals, peripheral driver(s) connected to at least one peripheral device, and a telecommunications network connecting the server and the processing device, said method comprising a step for the transmission, via the telecommunications network, of a message sent to the server by a user terminal or a message sent by the server to the user terminal.

Such methods are for example encountered in the ticketing field. As a reminder, ticketing relates to service operations, in particular sales operations, on contactless cards used by users, for example to travel on an operator's rail transportation network.

In the ticketing field, ticket window machines, each including an integrated man-machine interface (MMI), for example with a touch-sensitive screen, and further including an integrated contactless read/write peripheral for transportation cards running specific preinstalled ticketing software handling exchanges with the user, exchanges with the user's transportation card via the card read/write peripheral, and exchanges with a remote ticketing server.

Such an architecture has a certain number of drawbacks.

It is in particular necessary to manage the automaton fleet, to upgrade the ticketing software specific to each type of automaton in parallel, and to manage multiple versions of these software programs.

The applicant has thus conceived, according to the invention, of allowing a user with a personal user terminal equipped with a Web browser, for example a tablet or smartphone, to connect to the ticketing server by Internet, to choose a transportation card read/write peripheral, for example provided by the transportation operator and to which his transportation card is presented. More generally, the applicant has conceived of a solution to control any external peripheral, from a webpage situated on a user terminal near the peripheral.

To that end, the invention proposes a processing method of the aforementioned type, characterized in that it comprises the following steps:

interception, by said peripheral driver, of the message sent to the server by the user terminal, of the message sent by the server to the user terminal, respectively;

control, by said peripheral driver, based on said intercepted message, of at least one operation of the peripheral device;

modification of said intercepted message by said peripheral driver based on the controlled operation, then transmission by said peripheral driver of said modified message to the server, to the user terminal, respectively.

The server thus does not need to know the geographical proximity between the user browsing terminal and the peripheral, and the user is not required to enter a unique identifier of the peripheral when connecting to the Web server. It is only necessary for the actions initiated on the users terminal to first go through the remote server before being transmitted to the peripheral for action.

The present invention thus allows control of a peripheral using user terminals and a server while minimizing the processing time and volume of communication resources necessary. There is no need to install specific software on the user terminals. A simple standard Web browser is sufficient to carry out the invention using a user terminal.

In embodiments, the processing method according to the invention further includes one or more of the following features:

said messages and modified message are HTTP or HTTPS responses or requests;

the server is a ticketing server and the peripheral device is a tool for reading/writing information on electronic chip cards; the controlled operation of the peripheral device comprises reading or writing information on an electronic chip card via the read/write tool, said read or written information depending on said intercepted message, and the modification of said intercepted message depends on said read or written information;

the peripheral device is a contactless tool for reading/writing information on electronic chip cards;

the peripheral driver is connected to several peripheral devices and the peripheral driver selects, based on the content of the intercepted message, the peripheral device that it will control;

said peripheral driver does not transmit a message to the server that it receives and that is sent to the server by a second user terminal as long as a transaction in progress, initiated on a first user terminal and the server, has not been completed, transaction messages being sent via the peripheral driver;

said peripheral driver filters the intercepted message based on the recipient of the message and/or based on the presence or absence of a keyword in the URI of the message.

According to a second aspect, the present invention proposes a computer program intended for a peripheral driver connected to at least one peripheral device and positioned between at least one user terminal and a telecommunications network to which a server is connected, said program including instructions for carrying out the steps, for which the peripheral driver is responsible, of the method according to the first aspect of the invention when the program is run by a computing means of the peripheral driver.

According to a third aspect, the present invention proposes a peripheral driver suitable for being positioned between at least one user terminal and a telecommunications network to which the server is connected, and further suitable for being connected to at least one peripheral device, said peripheral driver being characterized in that it is suitable for intercepting a message sent to the server by the user terminal via the network, respectively a message sent by the server to the user terminal via the network, said peripheral driver being suitable for controlling at least one operation of the peripheral device based on said intercepted message, modifying said intercepted message based on the controlled operation, then sending said modified message to the server, to the user terminal, respectively.

These features and advantages of the invention will appear upon reading the following description, provided solely as an example, and done in reference to the appended drawings, in which:

FIG. 1 shows a system implementing one embodiment of the invention.

Figure 1:
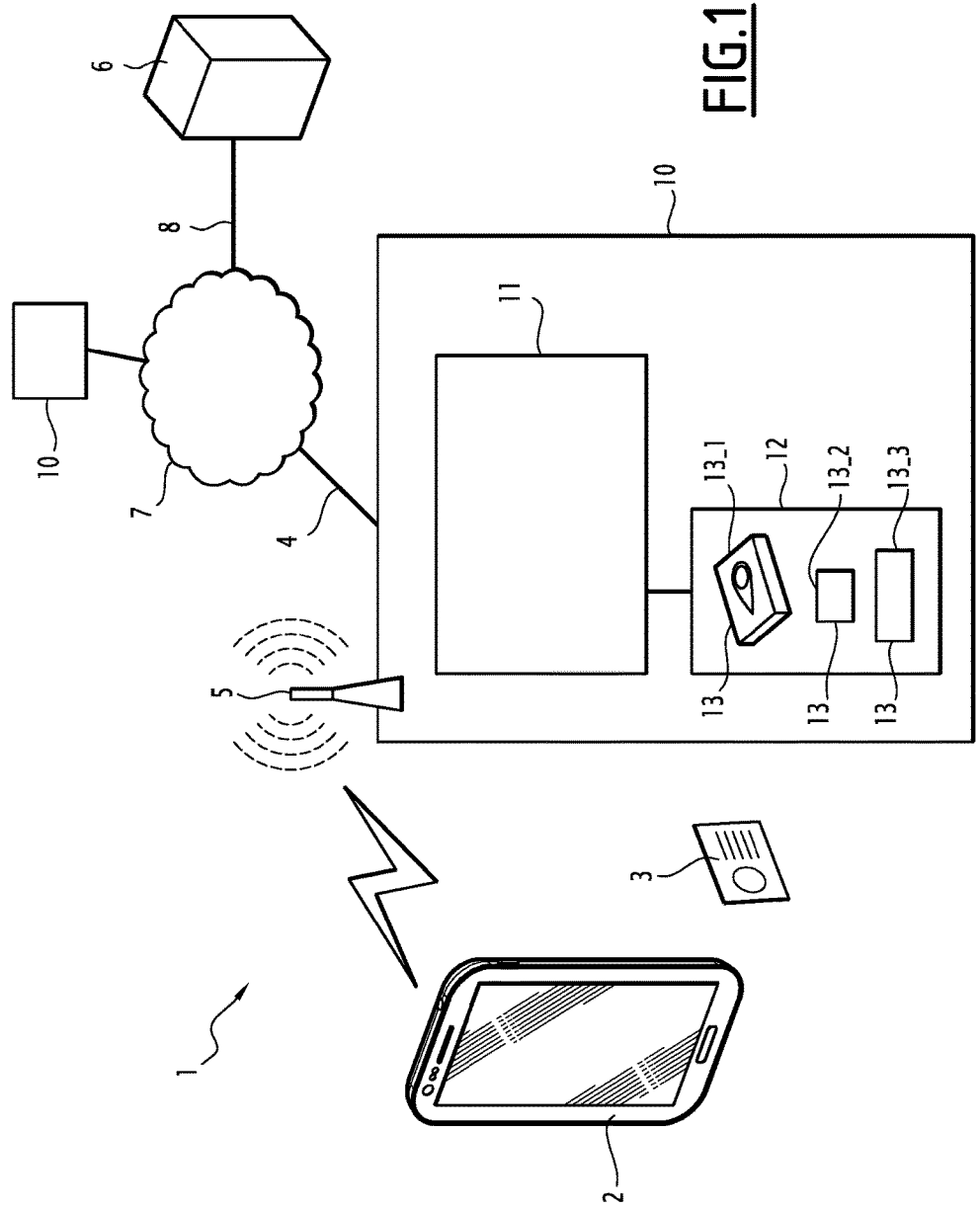
FIG. 1 shows a view of a system implementing control of peripheral(s) in one embodiment of the invention.

The system 1 includes one or several blocks 10 of peripherals, a Web server 6 and a plurality of user terminals 2.

In the case considered here, the Web server 6 is a ticketing server 6.

Each user terminal 2, whether fixed or mobile, comprises a Web browser and a man-machine interface (MMI). The MMI of the user terminal 2 comprises a display screen, in particular for webpages, and a keypad.

The Web browser is suitable for sending http requests and receiving https responses making it possible to display webpages on the user terminal 2.

The user terminals 2 for example include smartphones, mobile telephones, touch-sensitive tablets, desktop PCs, etc.

The user terminals 2 comprise radio communication means with a local wireless network (such as Wi-Fi, Bluetooth, etc.), for example, Wi-Fi in the case considered here.

Each block 10 of peripherals is connected to the web (IP network) 7, for example by an Ethernet connection 4, and includes a local wireless network access point 5, Wi-Fi in the case at hand 7.

A block 10 of peripherals includes a peripheral driver 11 and a set 12 of peripherals.

The set of peripherals 12 includes one or several peripherals 13. In the case considered here, the set of peripherals 12 for example includes at least one contactless read/write tool 13_1, for example NFC, ISO/IEC standard 14443) on electronic transportation cards 3. The peripherals 13 can be of various natures: screen, printer, photo device, camera, scanner, etc.

The ticketing server 6 is connected to the Web 7 by an Ethernet connection 8.

In the considered application to the ticketing field, a block 10 of peripherals can in particular be situated in a train station, a shopping center, a building entryway, or even users' homes.

The block 10 of peripherals is suitable for using the access point 5 to collect the requests to connect to the IP network 7 sent from the user terminals 2 by Wi-Fi. In one embodiment, the block 10 of peripherals is suitable for being the entry point for requests to connect to the local Wi-Fi network, and accepting or refusing connections to the local Wi-Fi network by the terminals 2. In one alternative, the flow of the local network is routed toward the block 10 of peripherals.

The driver 11 of the block 10 of peripherals is further suitable for detecting, then interpreting and/or completing some of the orders sent from the browser of a user terminal to the ticketing server 6 and controlling the peripherals 13 associated with it accordingly.

In one embodiment, the driver 11 of the block 10 of peripherals is further suitable for detecting and interpreting and/or completing some of the commands sent from the ticketing server 6 to a user terminal and controlling the peripherals 13 associated with it accordingly.

In one embodiment, the driver 11 is suitable for specifically intercepting HTTP (HyperText Transfer Protocol) exchanges between the terminals 2 and the server 6, and relaying the other exchanges transparently. It is suitable for interpreting the HTTP requests and responses exchanged between the terminals 2 and the server 6 so as to determine, based on their content (for example, based on the syntax of the requesting URIs), the peripheral(s) 13 to be controlled and the respective action or sequence of actions to have them carry out (these actions are for example controlled by the driver 11 using "business" logics specific to the peripherals 13 and stored in the memory of the driver 11).

For each detected HTTP response or request message exchanged between the server 6 and a terminal 2, the driver 11 determines how the message must be processed and/or relayed locally, for example by carrying out one and/or another of these processing operations:

forwarding the message directly to its recipient;
generating and sending a response to the message directly;
completing the request from the terminal 2, then forwarding it to the server 6;
completing the response from the server 6, then forwarding it to the terminal 2;
interacting with the server, with the terminal 2, respectively, before sending a response to the terminal 2, the server 6, respectively;
sending a new request after receiving a response from the server 6, etc.

The following two functions are therefore implemented by the driver 11:
a "proxy" function for intercepting and routing HTTP messages, and
an interpretation function of these messages, further making it possible to deduce actions to be commanded on the peripherals 13 based on business logics, for example using state machines to manage the asynchrony of some of request/response/read/write events, or using stateless system(s), in particular if the URIs of the http requests and responses are rich in information and individually carry the current state (RESTful principles). For example, the interpretation function is suitable for interpreting a restricted set of commands of the CRUD (Create, Read, Update and Delete) type.

The proxy function intercepts and routes HTTP messages for example based on the recipient's address and URI templates (cf. the definition by the IETF in RFC6570: http://tools.ietf.org/html.rfc6570), for example GET http://www.thales-ticketing.com/Beacon/*, pre-established and configured to divert the request or response to the appropriate section of the interpretation function, and is suitable for forwarding (or not forwarding) the divergent request/response, modified (or not) in return. The proxy function also allows the interpretation function to initiate intermediate requests to the server 6 spontaneously and recover the response therefrom.

In one embodiment, the driver 11 is suitable for communicating according to Web security standards, such as the https (HyperText Transfer Protocol Secure), SSL (Secure Sockets Layer) or TSL (Transport Secured Layer) protocols with respect to the terminals 2 and/or the server 6.

Figure 2:
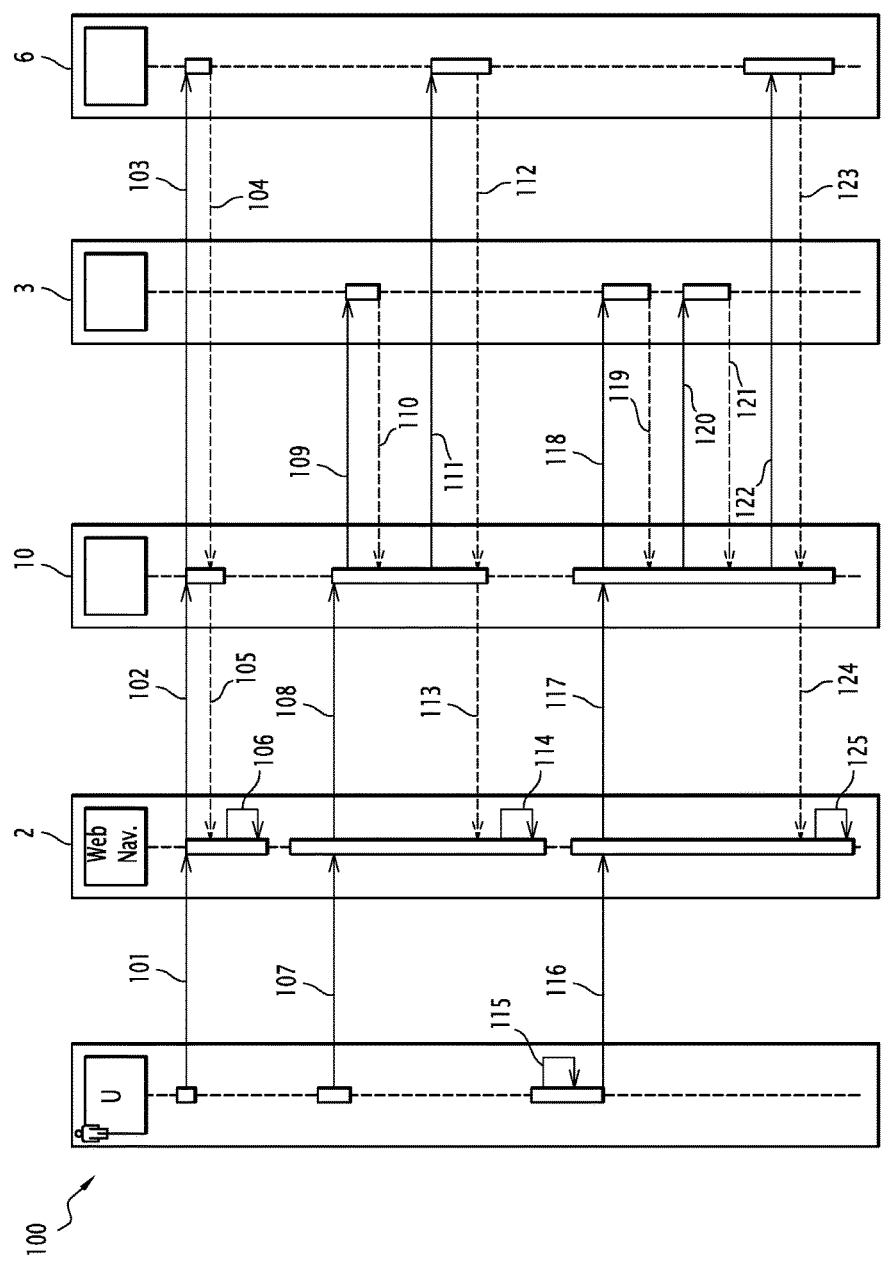
FIG. 2 is a view of steps carried out in one embodiment of the invention.

A set 100 of steps carried out between the user U, the Web browser of the user terminal 2, the block of peripherals 10, the contactless card 3 of the user U and the ticketing server 6 in one example of the invention is now described in reference to FIG. 2.

It will be noted that the URI and URL indicated below are of course provided solely as examples.

The driver 11 of the block of peripherals 10 is suitable for intercepting HTTP requests for the URL (Uniform Resource Locator) of the ticketing server, which in the case at hand is www.thales-ticketing.com and the base of the URI (Uniform Resource Identifier) of which begins with "Beacon", and deducing a control to be carried out on the peripheral 13.1 therefrom.

A user U of a transportation network wishes to reload the electronic wallet of this contactless card 3, the current balance of which is € 100.

To that end, in a prior step, he uses his user terminal 2, for example a smartphone, to connect to the Wi-Fi network implemented by the access point 5 of the block 10 of peripherals situated nearby (for example, the name of the Wi-Fi network sent by the access point 5 is readable on the block 10 of peripherals).

In a step 101, the user U enters the URL (Uniform Resource Locator) of the ticketing website in the Internet browser of his terminal 2.

In a step 102, the user sends an http request GET www.thales-ticketing.com to the server 6.

This request is relayed in a step 103 by the block 10 of peripherals, without modification or intervention (absence of URI base beginning with "Beacon"), to the ticketing server 6.

An HTTP response is returned by the server 6 to the user terminal 2, in a step 104: HTTP OK: HTML Login Page. It includes a login page asking the user to present his contactless card 3 to the contactless read/write tool 13_1 and enter his pin code.

This HTTP response is also simply relayed by the driver 11 in a step 105.

When the Web browser of the user terminal 2 receives this response, it displays the login page on the screen of the telephone 2 in a step 106.

The user U presents his card 3 to the read/write tool 13_1 and enters his PIN code in a step 107.

After the user U has entered the PIN code, in a step 108, an HTTP request (GET http://www.thales-ticketing.com/Beacon/Login?pincode=AzeZEtqfdg) including the value of this encrypted PIN code, is sent to the ticketing server 6. The verb GET used for the request assumes that the action is idempotent (view only, no modification, therefore repeatable).

In a step 109, this request sent to the server 6 and with the "Beacon" base is intercepted by the block 10 of peripherals.

The driver module 11 further identifies the "Login" command in the URI of the request, and according to the ticketing business rules established in the business software of the driver 11, commands the read/write tool 13_1 accordingly to read, on the card 3 then presented to the tool 13_1, the unique identification number (MediaID) and the electronic wallet balance (TPurse). This information is read by the tool 13_1 and sent to the driver 11 in a step 110.

In a step 111, the driver 11 adds these two pieces of information to the initial request from the user terminal 2, replaces the "Beacon" base with "Server", then send the request thus modified to the ticketing server 6, i.e., GET http://www.thales-ticketing.com/Server/Login?pincode=AzeZEtgfdg&mediaID=ZErZerzRZErre&tpurse=100 (no business rule henceforth applies to the returned modified URL).

In a step 112, the ticketing server 6 uses this identification information (in particular verifies the association between the entered PIN code and the unique identification number) and balance information and returns a webpage to the user terminal 2 containing the information associated with the users account and the presented card, including the balance of the wallet (http OK: HTML Customer Media Page). This page also proposes to credit the wallet by an amount to be entered.

This page is relayed to the user terminal 2 by the driver 11 with no intervention in a step 113.

When it receives this page, in a step 114, the Web browser of the terminal 2 displays it, thus showing the balance of €100 to the user U, and a field to be filled in by the user to indicate the amount to be credited to the card.

In a step 115, the user U enters an amount to be credited of €10 in this field, and in a step 116, validates this requested reloading.

A request (step 117) is sent by the Web browser of the user terminal 2 with the command "Reload" (PUT http://www.thales-ticketing.com/Beacon/TPurse/Reload?mediaID=ZErZereRZErre&amount=10), this time with the HTTP verb PUT, since one wishes to write the new credited balance on the card.

As before, in a step 118, the driver 11 intercepts this request (sent to the server and which comprises the "Beacon" base). It further identifies the "Reload" command, in the URI of the request, and according to the established ticketing business rules, deduces from this that it must command the read/write tool 13_1 to read the identification number MediaID and the balance on the card 3 then presented to the tool 13_1.

This information is provided by the tool 13_1 in a step 119.

In a step 120, the driver 11 verifies that this provided information is indeed identical to that present in the processed URI, and in the affirmative, adds the amount to be credited to the balance (the result of this sum is then €110), then commands the tool 13_1 to rewrite the new value on the card 3.

Once the tool 13_1 has confirmed that the writing has been done (step 121), the driver 11 modifies the URI, replacing "Beacon" with "Server" and adding the amount of the credit and the current balance of 110, and forwards (step 122) this modified http PUT request to the server 6 (state modification action): PUT http://www.thales-ticketing.com/Server/TPurse/Reload?mediaID=ZErZereRZErre&amount=10&tpurse=110.

In a step 123, the server 6 takes the result of the action on the card 3 indicated in the received request into account and returns a response to the user terminal 2 indicating that this new balance has been taken into account: http OK: TPurse=110.

The driver 11 receives this response and forwards it directly (step 124) to the user terminal 2 as if it was a response to its initial request and not that modified by the driver.

The response is a webpage that is displayed by the Web browser (step 125) and that shows the result of the operation with a credited balance that the user will be able to verify before removing his card.

It is assumed that the payment will be done through a billing process linked to the user's account on the ticketing server 6.

The invention, rather than linking the ticketing server independently and separately to the user terminal and the read/write tool, thus associates the read/write tool with a peripherals driver that acts as an intermediate router toward the ticketing server 6, and more generally toward the IP network 7.

In one embodiment, the set of peripherals 12 further includes an LED 13_2 and a receipt printer 13_3, and some http requests or responses are interpreted as commands to control these peripherals, so as for example to print at the end of the reloading procedure for the credit outlined above, a receipt indicating the added credit and the total balance, for instance, or to illuminate an LED when the card 3 is being read/written by the contactless read/write tool, etc. The driver 11 is then suitable for determining, based on intercepted http response or request, which peripheral 13 needs to be controlled and what action(s) need to be controlled through this peripheral.

In one embodiment, the block 10 of peripherals only allows one user terminal 2 to connect to the Wi-Fi network at a time, to make the control of the peripherals 13 exclusive.

For example, the driver 11 does not send the server 6 a request that it receives and that is sent to the server 6 by a user terminal before a transaction in progress initiated between another user terminal and the server is complete, said requests and responses of the transaction being transmitted via the driver.

It will be noted that having a user face the read/write tool that he exclusively uses during the operation also, by design, precludes the risk of several cards being in the read/write field of the tool 13_1 at the same time.

In one embodiment, a user terminal 2 stores a software instruction program, which, when run by a microprocessor of the user terminal, is suitable for carrying out the steps performed by the user terminal and explained above.

Likewise, in one embodiment, a driver 11, respectively a block 10 of peripherals, stores a software instruction program, which, when run by a microprocessor of the driver, of the block 10 of peripherals, respectively, is suitable for carrying out the steps performed by the driver, the block 10 of peripherals, respectively, indicated above.

The Web server 6 thus does not need to know the geographical proximity between the user's browser terminal and the peripherals, and the user is not required to enter a unique identifier of the peripheral when connecting to the Web server. It is not necessary for the actions initiated on the webpage of the browser to go through the remote server first before being sent to the peripheral for action.

The present invention thus makes it possible to save processing time and reduce the volume of communication resources used.

In one embodiment, the following steps are implemented between the user U, the Web browser of the user terminal 2, the block of peripherals 10, the contactless transportation card 3 of the user U and the ticketing server 6.

The user U uses his user terminal 2 to request the purchase of travel rights from the server 6: for example, the purchase of a transportation title valid for the entire upcoming month (for example, the month of January 2014), within zones 1-3 of the Il-de-France transportation network. The driver 11 intercepts the corresponding HTTP request sent by the user terminal 2 to the server 6, commands the card reader 13_1 to read the user's customer number in a customer number field of the user's contactless card 3, completes the HTTP request with this number and sends the HTTP request thus completed to the server.

Exchanges next take place between the user U and the ticketing server 6 relative to the remote payment this transportation title.

Once the payment has been validated by the ticketing server 6, the ticketing server 6 has updated its customer database regarding the new transportation title purchased by the user based on the user's customer number and the purchased transportation title, the server 6 sends an HTTP response to the user terminal 2 confirming that the purchase of the new transportation title has been correctly taken into account, this response further indicating the validity period (in the case at hand, January 2014) and geographical range of this travel right (zones 1-3 of the transportation network in the case at hand). The driver 11 intercepts this HTTP response, and commands the card reader 13_1 to write the validity duration indicated in the intercepted HTTP response in a validity duration field within the transportation card, and to write the geographical range of the travel right indicated in the intercepted HTTP response in a geographical range field within the transportation card. The intercepted response is then sent to the user terminal 2.

According to the embodiments, only HTTP requests intended for the ticketing server 6 are intercepted and analyzed, the HTTP requests intended for other entities and/or under other protocols simply being relayed transparently, or on the contrary not being relayed.

In the embodiment described above, the user terminals, the other Web browser and the Web server 6 communicate by implementing the http protocol, the user terminals being at the initiative of requests passing through the block of peripherals 10, the server being at the initiative of the responses to these requests. In other embodiments, the server is at the initiative of the http requests and the terminals at the initiative of the http responses.

The invention can of course be implemented when the Web browsers of the terminals and servers communicate using other protocols, for example https, etc.

In one embodiment, the Web server 6 is hosted locally on the block 10 of peripherals, thus making the control of the peripherals 13 from the user terminals 2 completely autonomous on the local network, or serving as a fallback server in a downgraded mode scenario during a prolonged disconnection from the remote server.

In one embodiment, the block 10 of peripherals is integrated into a user terminal 2.

The present invention has been described above in reference to the field of ticketing, but may of course be implemented to control any type of peripheral using a webpage displayed on a user terminal from a Web server.

The invention claimed is:

1. A method for controlling peripherals in a system comprising a ticketing server, user terminals, a peripheral driver connected to at least one peripheral device, and a telecommunications network connecting the server and the processing device, the peripheral device being a contactless tool for reading/writing information on electronic chip cards, the method comprising the following steps:
  transmission, via the telecommunications network, of a message sent to the ticketing server by a user terminal or a message sent by the ticketing server to the user terminal;
  interception, by said peripheral driver, of the message sent to the ticketing server by the user terminal, of the message sent by the ticketing server to the user terminal, respectively;
  control, by said peripheral driver, based on said intercepted message, of at least one operation of the peripheral device;
  modification of said intercepted message by said peripheral driver based on the controlled operation, then transmission by said peripheral driver of said modified message to the ticketing server, to the user terminal, respectively,
wherein the controlled operation of the peripheral device comprises:
  reading information on a chip card via the reading tool, said read information depending on said message intercepted by the peripheral driver and sent to the user terminal by the ticketing server, or
  writing information on a chip card via the writing tool, said information written in the chip depending on said message intercepted by the peripheral driver and sent to ticketing server by the user terminal,
  said modification of said intercepted message depending on said read or written information.

2. The peripheral control method according to claim 1, wherein said messages and modified message are HTTP or HTTPS responses or requests.

3. The peripheral control method according to claim 1, wherein the peripheral driver is connected to several peripheral devices and the peripheral driver selects, based on the content of the intercepted message, the peripheral device that it will control.

4. The peripheral control method according to claim 1, wherein said peripheral driver does not transmit a message to the ticketing server that it receives and that is sent to the ticketing server by a second user terminal as long as a transaction in progress, initiated on a first user terminal and the ticketing server, has not been completed, transaction messages being sent via the peripheral driver.

5. The peripheral control method according to claim 1, wherein said peripheral driver filters the intercepted message based on the recipient of the message and/or based on the presence or absence of a keyword in the URI of the message.

* * * * *